United States Patent [19]  
Griffiths et al.

[11] 4,252,845  
[45] Feb. 24, 1981

[54] GRAPHIC ARTS INK AND ERADICATOR COMBINATION

[75] Inventors: Kenneth G. Griffiths, Downers Grove; Arnel D. Potter, Lake Forest, both of Ill.

[73] Assignee: Zipatone, Inc., Hillside, Ill.

[21] Appl. No.: 964,920

[22] Filed: Nov. 30, 1978

[51] Int. Cl.³ ........................ B05D 3/10; C09D 11/00
[52] U.S. Cl. ...................................... 427/273; 106/21; 406/696
[58] Field of Search ................. 106/21; 427/140, 145, 427/337, 273; 252/105; 406/696

[56] References Cited

U.S. PATENT DOCUMENTS 1,905,118  4/1933  Nadell ................................. 400/696

OTHER PUBLICATIONS

Chem Abst. 54:23,130b.

*Primary Examiner*—Theodore Morris
*Attorney, Agent, or Firm*—Mason, Kolehmainen, Rathburn & Wyss

[57] ABSTRACT

An ink and eradicator system for use in the graphic arts comprising an ink containing a dye which is reducible to a colorless form in combination with a volatile acid and a non-volatile organic acid, dissolved to an aqueous solvent; and an ink eradicator containing a soluble sulfite or phosphite reducing agent and an aliphatic organic amine, dissolved in an aqueous solvent.

8 Claims, No Drawings

GRAPHIC ARTS INK AND ERADICATOR COMBINATION

This invention relates to a combination of ink and ink eradicator useful in the graphic arts. More particularly the invention relates to an ink which can be applied to paper to produce graphic representations thereon which can thereafter be quickly and easily eradicated, in whole or in part, by an eradicator which renders the ink colorless and thus provides a clean surface on the paper to which the ink can thereafter be promptly reapplied to produce modified graphic representations. The invention also relates to a method of applying and removing graphic representations on paper or other cellulosic material.

BACKGROUND OF THE INVENTION

In the graphic arts it is commonplace to apply an ink through a felt-tip pen or similar instrument to paper which causes a graphic representation to be produced thereupon, followed by eradication of part or all of the graphic representation, followed in turn by reapplication of ink to produce a modified graphic representation. Inks and ink eradicators are known which can be used for such purposes but to date no such inks and eradicators have been produced which provide a system whereby the ink can be promptly eradicated after application and then promptly reapplied to the eradicated surface. In prior practice it has been necessary to allow the paper or other sheet material to become thoroughly dry after application of the ink before the ink eradicator has been applied thereto and it has also been necessary to allow the paper to become thoroughly dry after application of the ink eradicator before the ink could be reapplied.

An object of this invention is to provide a system of ink and ink eradicator which can be used promptly one after the other without prolonged delay for drying and evaporation of solvents and chemicals. Another object is to provide an ink-eradicator system which can be used in the graphic arts to produce graphic representations on paper or similar sheet material and to provide for rapid modification of the graphic representations by use of an eradicator followed by application of the ink to produce a modified graphic representation on the same sheet without any significant time delay. It is a further object of this invention to provide a non-photographic ink which can be applied to art works without producing images on orthochromatic film.

GENERAL DESCRIPTION OF THE INVENTION

We have discovered that an ink containing a dye which can be modified to a colorless form by reaction with a chemical reducing agent in combination with a volatile acid and a non-volatile acid forms a desirable dye for use in the graphic arts in combination with an eradicator comprising an organic base and an inorganic reducing agent in aqueous solution. This combination of ink and eradicator forms a system whereby the ink can be applied to paper or similar sheet material to produce a graphic design or image and then immediately thereafter all or part of the graphic design or image can be rendered colorless and eradicated by application of the eradicator solution whereby the reducing agent converts the dye contained in the ink into a colorless form, thus removing the graphic design or image in areas treated with the eradicator. This system has the desirable advantage that ink can thereafter by promptly reapplied to the paper or sheet material to produce, in all or in part, a modified graphic design or image in the desired form.

In the graphic arts, illustrators and artists often sketch pictures, designs and other artwork on paper with colored ink. In such operations it is common to need to modify or otherwise remove part or all of the graphic image in order to allow the artist or illustrator to change the graphic image into a modification more suitable for his purpose. In working with inks on paper it is desirable to have rapidly operating eradicators which can remove all or part of the ink image and which thereafter produce a surface which will again accept ink promptly to produce a similar, modified or even identical image. This allows an illustrator to modify his graphic representations as he sketches or paints, with the result that by use of the combination of ink and eradicator described herein he can produce modifications or rearrangements of the graphic illustrations to suit his desires and goals.

In the system of this application the ink is an aqueous dilute solution of a dye which can be reduced from its colored form to a colorless form (sometimes known as a leuco form) by application of a solution of reducing agent thereto. The ink comprises the aforesaid dye with a combination of a volatile acid such as hydrochloric or hydrobromic acid and a non-volatile organic acid such as tartaric or citric acid. These materials in water form a solution which can be used as an ink for forming graphic images on sheet material. The acids maintain the dye in colored form and also serve to neutralize any alkaline materials in the paper or other sheet material. Almost immediately upon application, the water and hydrochloric or hydrobromic acid evaporate leaving the dye and organic acid on the surface of the sheet material, thus forming thereon a graphic image. In less than a minute after applying the ink the surface of the paper is ready to receive applications of eradicator composed of an aqueous solution of an inorganic reducing agent such as a water-soluble sulfite or a water-soluble phosphite with an aliphatic organic amine such as morpholine, piperidine, pyrrolidine, cyclohexylamine, n-butylamine, or ethylenediamine. The eradicator contains enough organic base to raise the pH of the paper or other sheet material to which it is applied to a value of at least 9 and usually in the range of 10 to 13, preferably 10.5 to 12. The reducing agent in the eradicator converts the dye of the ink into a colorless form and thus removes the graphic image created by the ink.

Immediately after eradication, the surface of the paper or sheet material can again be treated with ink applied by brush or pen to produce a new, modified or identical graphic representation on the paper or sheet. The volatile acid in the ink neutralizes the organic amine of the eradicator solution and lowers the pH of the treated area to a value of about 2–3. On standing in air, the excess of the volatile acid evaporates leaving a residue of ink and the non-volatile organic acid on the surface with a pH of about 5. The eradication and re-inking steps can be repeated as desired until the graphic representation appears in the form and color selected by the artist or illustrator.

An optional modification of this invention relates to nonphotographic ink and an eradicator therefor, particularly to an ink that is nonphotographic on standard orthochromatic film and thus can be used for notations on the artwork because, when the artwork is photographed according to the usual practice, when the artwork is photographed according to the usual practice, no image is produced on the film from the notations. In commercial art for advertising and illustration purposes, it is common practice to prepare an art piece which is photographed on orthochromatic film for reproduction purposes. Such film is sensitive to all colors but red. Often notations are made on the artwork or piece which are not desired to be reproduced on the photographs. Such notations are often made with blue pencil or crayon because blue is not reproduced on the film and, consequently, the reproductions will correspond to the original artwork without notations. Often the original artwork is used for several purposes. For each use, the notations on the original must be removed and usually new notations are made thereon. The removal of notations in blue pencil or crayon often is difficult, and the erasure may leave the surface of the artwork unsuitable for further notations or for photographing. It is thus desirable to have colored ink which is nonphotographic and which also can be easily eradicated without adverse effect on the surface of the artwork.

In one preferred form of the invention the ink contains a blue dye which produces a blue image on the paper or sheet material. This blue ink has the advantage that it can be used for marking or annotations on a previously produced graphic arts materials and the latter can be photographed with orthochromatic film for reproduction purposes without reproducing the markings made by the blue ink thereon. The blue ink can be eradicated as described above, just as can inks in other colors. The only advantage of the blue ink is that it can be used for notations on previously produced illustrations or drawings and the latter can be photographed without copying the notations in blue ink if such is desired. Certain yellow dyes and combinations of yellow and blue dyes can be used to produce similar inks which are not photographed.

DETAILED DESCRIPTION OF THE INVENTION

The inks which form part of this invention are aqueous solutions of dyes which are reducible to colorless forms, in combination with a volatile acid and a non-volatile acid. There are a variety of water-soluble dyes which are suitable for this purpose, including C.I. acid blue 22, Astra violet 3RA Extra (Verona Dyestuffs), Sevron Brilliant red 4G (DuPont), Sandocryl Brilliant red B-3B (Sandoz), C.I. acid red 33, Astrazon violet F3R1 (Verona) , Deorlene Brilliant red R (CIBA), C.I. acid violet 19, C.I. basic red 27, C.I. basic green 1, and C.I. basic violet 21. These inks are solutions containing 0.1 to 0.5 grams of the dye in 100 milliliters of water. In addition to the dye the ink contains two acids, one being a volatile strong acid such as hydrochloric or hydrobromic at concentrations of from approximately 0.5 to 5% by weight and a non-volatile acid such as tartaric or citric acid in concentrations of approximately 1 to 5%.

When the aqueous ink solution containing the dye and combination of acids is applied to paper or similar sheet material the volatile acid quickly evaporates as does the water, leaving a colored image of dye plus non-volatile acid at a pH of about 5 to 5.5. The dye forms a colored graphic representation which is visible to the naked eye. If part or all of the graphic representation is to be moved or modified, an aqueous eradicator solution is applied containing about 1 to 5% by weight of an inorganic reducing agent such as a water-soluble sulfite or phosphite, usually an alkali metal sulfite or phosphite, in combination with 2–5% by weight of an organic base of the type described above, such as morpholine. When this eradicator solution is applied to the graphic image containing the dye discussed above, the reducing agent converts the dye into a colorless form while the organic amine neutralizes the acid in the image. This produces a colorless area which can be further covered, if desired, with a graphic representation with the same or different ink. When the ink is reapplied to the eradicated area the volatile acid therein neutralizes the organic base and reduces the pH of the surface of the paper or other sheet material to a value around 2 to 2.5. In this way it is possible to produce another graphic image on the same area which has been treated with eradicator. All of these steps can be conducted almost simultaneously in rapid succession which is an advantage never achieved heretofore.

The invention is described in further detail by means of the following examples which are provided for purposes of illustration only. It will be understood that numerous other equivalent materials can be used without departing from this invention.

EXAMPLE 1

A blue, nonphotographic ink is produced by dissolving in about 80 ml of water:
0.16 gram of Ink Blue G (also known as C.I. Acid Blue 22)
1.0 gram of concentrated hydrochloric acid
2.0 grams of taratric acid
Then sufficient water is added to make 100 ml. This solution forms a blue ink which can be applied with a felt-tip pen or brush. It dries rapidly on paper to form easily-read notations.

EXAMPLE 2

An ink eradicator solution is produced by dissolving in about 80 ml of water:
2.0 grams of sodium sulfite ($Na_2SO_3$)
2.0 grams of morpholine
Then sufficient water is added to make 100 ml. This solution, when applied to written notations made with the ink of Example 1, rapidly converts the blue ink to a colorless form. The ink of Example 1 may then be reapplied to the dried paper to produce colored notations thereon.

EXAMPLE 3

A blue ink is produced as in Example 1 from 0.16 gram C.I. Acid Blue 22, 1.0 ml of concentrated hydrochloric acid and 3.0 grams of citric acid in sufficient water to make 100 ml. It forms blue notations on paper.

EXAMPLE 4

An eradicator formulation is produced as in Example 2 from 2.0 grams of sodium sulfite, 0.5 gram of potassium dihydrogen phosphate ($KH_2PO_4$), 2.0 ml of morpholine and 2.8 ml of 70% isopropyl alcohol in sufficient water to make 100 ml. The alcohol acts as a wetting agent and aids in the penetration of the formulation into the paper.

EXAMPLE 5

An ink eradicator solution is produced by dissolving in about 80 ml of water:
2.0 grams of disodium orthophosphite ($Na_2HPO_3$)

2.0 grams of morpholine

Then sufficient water is added to make 100 ml. This solution, when applied to written notations made with the ink of Example 1, rapidly converts the blue ink to a colorless form. The ink of Example 1 may then by reapplied to the dried paper to produce colored notations thereon.

We claim:

1. An ink and eradicator system for use in the graphic arts which comprises:
   (a) an ink containing a dye which is reducible to a colorless form in combination with a volatile strong acid and a non-volatile organic acid, dissolved in an aqueous solvent, and
   (b) an ink eradicator containing a soluble sulfite or phosphite reducing agent and an aliphatic organic amine, dissolved in an aqueous solvent, said reducing agent capable of converting said dye of said ink to a colorless form when said ink eradicator is applied to said ink.

2. An ink and eradicator system according to claim 1 wherein the ink contains about 1 to 5 parts by weight of dye, about 5 to 50 parts of said volatile acid and about 10 to 50 parts of said non-volatile acid per 1000 parts of water.

3. An ink and eradicator system according to claim 2 wherein the eradicator contains about 1 to 5% of said reducing agent and about 2 to 5% of said aliphatic amine.

4. An ink and eradicator system according to claim 2 wherein the dye is a triphenylmethane dye.

5. An ink and eradicator system according to claim 2 wherein the volatile acid is hydrochloric acid.

6. An ink and eradicator system according to claim 2 wherein the soluble sulfite is sodium sulfite.

7. An ink and eradicator system according to to claim 2 wherein the amine is morpholine.

8. Method of applying and removing graphic representations from paper which comprises applying thereto an ink containing a dye which is reducible to a colorless form in combination with a volatile strong acid and a non-volatile organic acid, dissolved in an aqueous solvent, and thereafter removing all or part of the graphic representations by applying thereto an ink eradicator comprising a soluble sulfite or phosphite reducing agent and an aliphatic organic amine, dissolved in an aqueous solvent, said reducing agent capable of converting said dye to a colorless form when said ink eradicator is applied to said ink.

* * * * *